United States Patent [19]

Lachaux

[11] 4,386,627

[45] Jun. 7, 1983

[54] ACCUMULATOR HIGH FLOW VALVE

[75] Inventor: Maurice Lachaux, Eaubonne, France

[73] Assignee: Mercier Accumulator Corporation, Dover, Del.

[21] Appl. No.: 367,746

[22] Filed: Apr. 12, 1982

[30] Foreign Application Priority Data

Apr. 21, 1981 [FR] France ................................ 81 07885

[51] Int. Cl.³ ................................ F16L 55/04

[52] U.S. Cl. ................................ 138/30; 137/514.3; 138/31; 251/51

[58] Field of Search ................ 137/514.3; 138/30, 31; 251/51, 55; 220/85 B

[56] References Cited

U.S. PATENT DOCUMENTS 2,385,016 9/1945 Mercier ................................ 138/30
2,801,067 7/1957 Mercier ........................ 137/514.3 X
2,979,070 4/1961 Payne ................................ 138/30 X
4,164,242 8/1979 Sandaux ................................ 138/30

*Primary Examiner*—James E. Bryant, III
*Attorney, Agent, or Firm*—Arthur B. Colvin

[57] ABSTRACT

The valve of the pressure vessel has a head portion adapted to close the liquid orifice and a stem portion mounted slidably in a guide and defining therewith a variable-volume liquid chamber. A passage is provided between the chamber and an orifice disposed in the vicinity of the head portion. The passage comprise a cylindrical portion in which a ball or other closure member is mounted with a slight clearance, which makes it possible to prevent closure of the valve upon rapid restoration of the liquid in the course of operation, while nonetheless permitting complete emptying of the vessel when the liquid is restored slowly, for example for the purposes of maintenance or inspection.

21 Claims, 10 Drawing Figures

ACCUMULATOR HIGH FLOW VALVE

Figure 1:
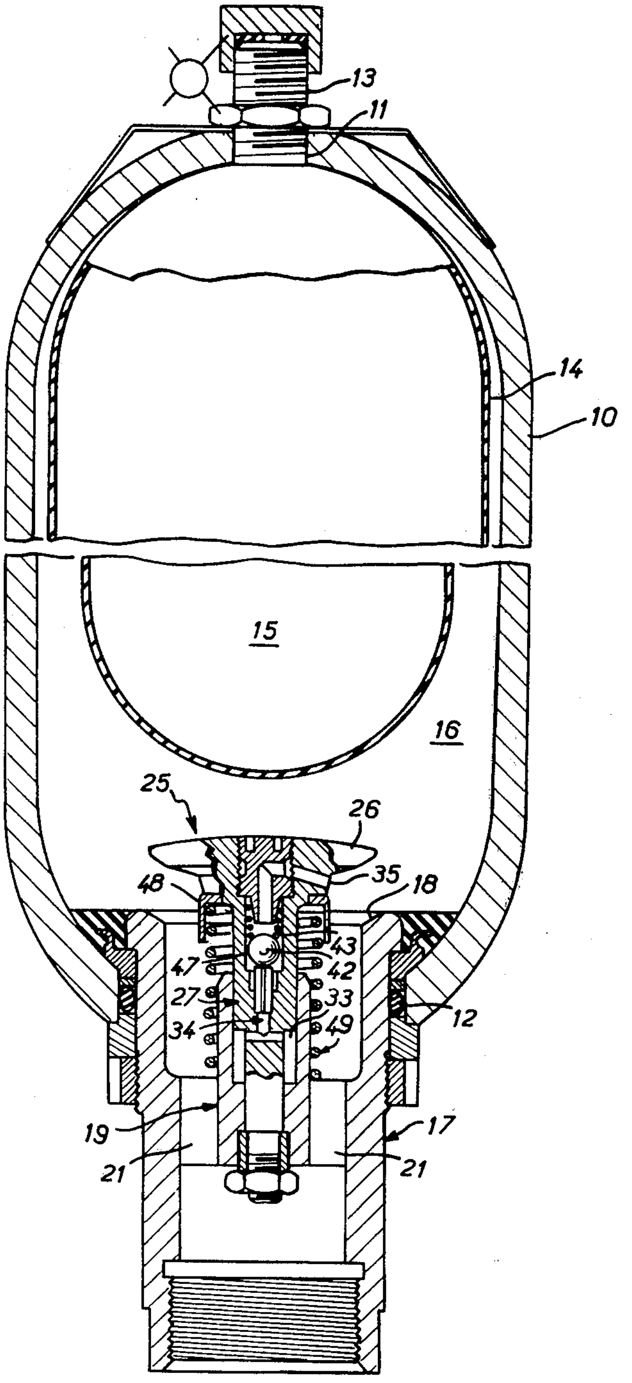

The invention relates to a valve for a pressure vessel, the pressure vessel comprising a casing having a gas orifice and a liquid orifice which are disposed opposite to each other, and a movable separator which extends within the casing between the two orifices and which divides it into a gas compartment and a liquid compartment which are variable in volume, the valve comprising a stem portion which is mounted slidably in a guide and a head portion which is adapted to close the liquid orifice.

In pressure vessels of this kind, the gas compartment is first pre-charged with gas under pressure, which displaces the movable separator into a position of bearing against the valve which closes on the liquid orifice of the pressure vessel. The gas compartment is then at its maximum volume.

The liquid orifice of the pressure vessel is then connected to a hydraulic installation. Liquid under a pressure which is higher than the gas precharge is introduced into the liquid compartment, lifts the valve and pushes the movable separator back.

The reservoir is then in a condition for operation.

In the course of normal operation, liquid is permitted to transfer between the hydraulic installation and the liquid compartment of the vessel, sometimes in the inward direction, whereby the volume of the liquid compartment of the vessel is increased, and sometimes in the outward direction, which restores the liquid to the hydraulic installation.

In the course of operation the valve may be inappropriately urged towards the closed position by the suction effect of the flow of liquid when liquid is being restored at a high flow rate to the installation, for example, when the liquid flow rate is higher than ten liters per second. There is a likelihood of such valve closure being brutal and, if it is repeated, it can be detrimental to the strength and performance of the vessel and its components.

In addition, as such a valve closure effect may occur in the course of operation, it may give rise to the danger of rendering the hydraulic installation inoperative.

The present invention concerns a valve for a pressure vessel, of the type specified, wherein the valve is prevented from closing during restoration of the liquid in the course of operation, even at a very high flow rate, with a very simple construction while automatically permitting complete emptying of the vessel when effected slowly, for example for the purposes of maintenance or inspection, without the danger of causing damage to the separator.

In accordance with the invention, a valve for a pressure vessel of the type specified comprises a variable-volume liquid chamber defined by the stem portion of the valve and the guide in which the stem portion is slidably mounted, said chamber decreasing in volume when the stem portion moves inwardly, said chamber communicating by passage means with an orifice disposed in the vicinity of the head portion of the valve, said valve being characterized in particular in that said passage means comprise on the one hand means for interrupting the flow of liquid from said chamber when said chamber decreases in volume and on the other hand leakage means between said chamber and an active portion of said liquid flow interrupting means.

More particularly, in accordance with the invention, said passage means comprise a cylindrical portion provided with a sealing seat at its end which is towards the orifice of said passage means, while said flow interrupting means comprise a closure member which is mounted movably in said cylindrical portion and is adapted to be thrust by the liquid into a position of being closingly applied against said seat in response to a reduction in volume of said chamber, said leakage means forming a permanent communication, of reduced section, between the two parts of the cylindrical portion, which are disposed on respective sides of the closure member.

When liquid is restored slowly to the hydraulic installation from the vessel, more particularly for the purposes of maintenance or inspection, the leakage means permit the variable-volume chamber to empty to the outside without displacing the closure member towards its seat. The valve can thus be completely closed under the thrust force of the movable separator, which permits the pressure vessel to be totally emptied for maintenance or inspection, without the danger of causing damage to the movable separator.

When, in the course of normal operation, there is rapid restoration of liquid at a high flow rate between the pressure vessel ad the hydraulic installation, the suction effect due to the flow of liquid causes the valve to begin a closure movement which tends to reduce the volume of the variable-volume chamber, which urges the closure member towards a closed position on its seat, notwithstanding the leakage means, the section of which is too small to permit an appreciable amount of liquid to escape through the leakage means. The liquid is then prevented from flowing out of the variable-volume chamber, for discharge to the exterior. This constitutes an automatic hydraulic blocking effect which prevents the valve from closing on the liquid orifice of the pressure vessel in operation thereof. This therefore avoids any untimely danger of closure, like damage to such a valve.

It will be appreciated that the arrangement according to the invention is of a particularly simple construction, and the mode of operation of the arrangement is automatic, without any complicated arrangement more particularly outside the valve.

It will also be appreciated that the invention is of particular interest when the volume of liquid flowing from the pressure vessel, which is capable of being absorbed by the hydraulic installation, is predetermined, at a constant value which is less than the maximum liquid volume of the liquid compartment of the pressure vessel, so that in the course of operation, the movable separator always remains away from the valve.

In accordance with another feature, at the end of the cylindrical portion of the liquid passage means, which is remote from the sealing seat and which is towards the variable-volume chamber, the cylindrical portion has a support for forming a rest condition for the closure member and towards which the closure member tends to be urged by a light spring, said support being capable of permitting the flow of liquid between the variable-volume chamber and the cylindrical portion, even when the closure member is resting on said support.

The support may comprise either a non-sealing seat for the closure member or a seat which in itself may have a sealing effect but which is associated with a by-pass passage which is always open between the variable-volume chamber and the cylindrical portion, or, if appropriate, an assembly formed by a non-sealing seat and a by-pass passage.

The support for defining a rest position for the closure member is for example defined by an end, which forms a non-sealing seat, of a split hollow pin or a notched or crenellated end, which also forms a non-sealing seat, of a hollow pin. The end of the hollow pin may also form a seat which in itself has a sealing action, in which case the arrangement has a by-pass passage which may be provided for example in the pin in the form of a lateral aperture and/or in the stem portion of the valve.

Preferably, adjusting means are provided for adjusting the height of the support for the closure member, which has an effect on the reaction time of the closure member. The adjusting means comprise for example a stack comprising a greater or smaller number of washers, or a screw means.

Preferably, the closure member is in the form of a ball but it may also be formed by a plunger piston, or in any other suitable manner.

The valve of the pressure vessel is urged towards the position of opening the liquid orifice of the pressure vessel by a spring. The spring may be of low spring force which may be only slightly greater than that required to balance the mass of the movable assembly, with an increase to take account of hydraulic resistance and friction forces, bearing in mind that the valve is locked in the open position in the course of operation of the arrangement, as indicated above.

It will be appreciated that, without the hydraulic locking device according to the invention, the spring for urging the valve towards the open position must be a very strong spring in order to prevent premature closure of the valve in the course of operation of the arrangement, which increases the danger of damage to the movable separator in emptying operations, more particularly for the purposes of maintenance or inspection.

In a preferred embodiment, the orifice of the liquid passage means associated with the variable-volume chamber is disposed immediately below the head portion of the valve. Preferably, an annular deflector is disposed beneath the head portion of the valve to prevent the turns of the valve return spring from being collapsed or crushed, as a result of a high-speed flow of liquid.

The orifice of the liquid passage means associated with the variable-volume chamber is advantageously disposed within the annular deflector, where the pressure is relatively low.

The leakage means may be formed in any suitable manner, for example by providing a small diametral clearance between the closure member and the cylindrical portion of the passage means, or a narrow passage formed either in the closure member or in the stem portion of the valve.

Figure 3:
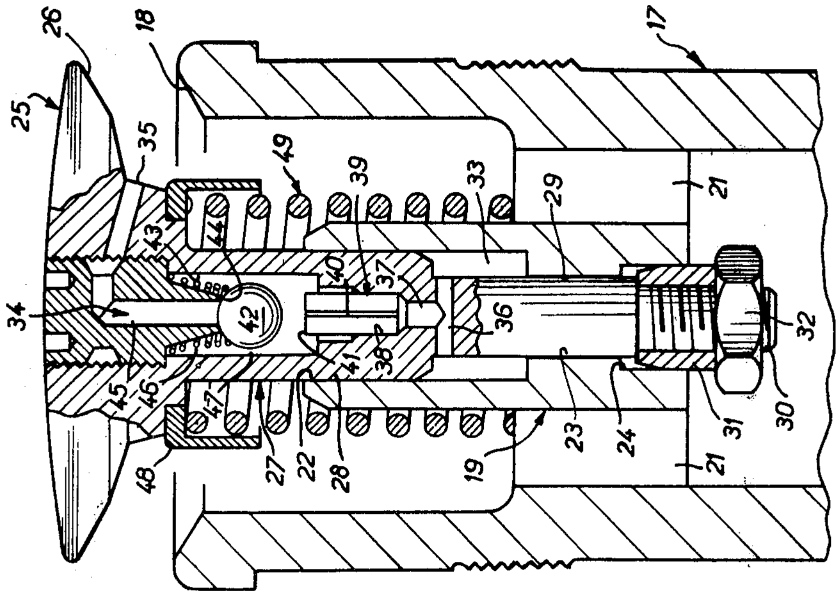
Figure 2:
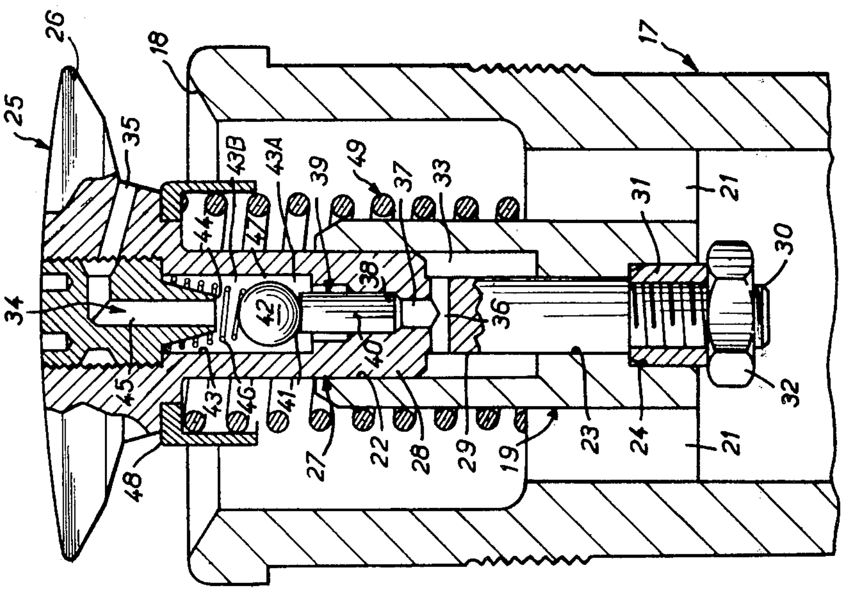
Figure 4:
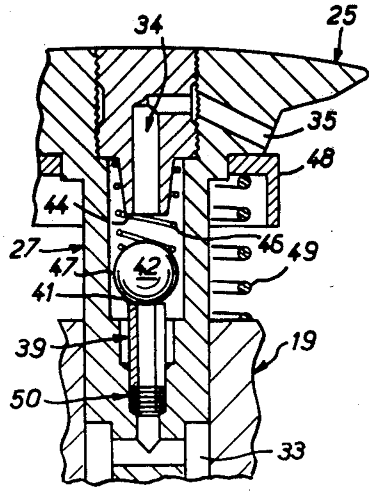
Figure 5:
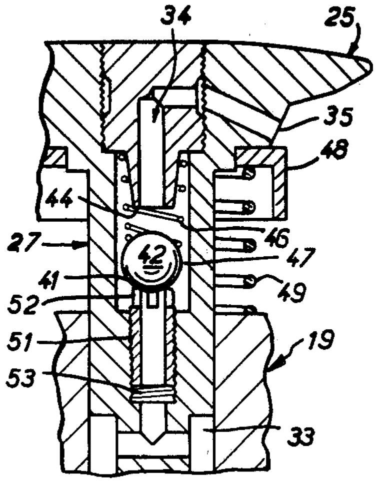
Figure 6:
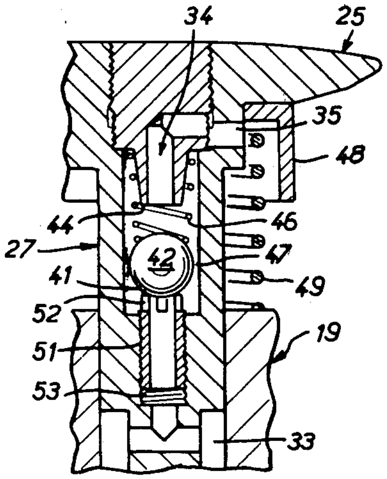
Figure 7:
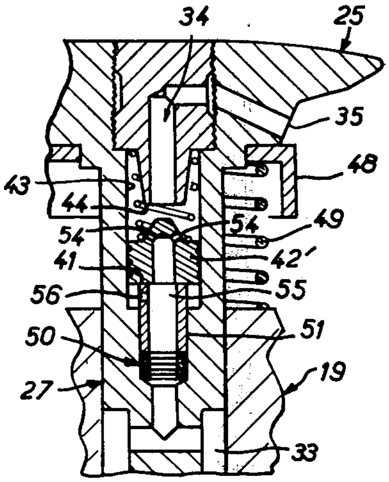

Embodiments of the invention are described hereinafter by way of example with reference to the accompanying drawings in which:

FIG. 1 is a general, partly broken-away view in longitudinal section of a pressure vessel provided with a valve according to the invention, FIG. 2 is a view on a larger scale of the valve with its liquid passage means and the closure member in the open position, to permit the vessel to be emptied slowly, FIG. 3 is a view similar to FIG. 2 but showing the closure member in its closed position against its sealing seat, to prevent the valve from being closed, by a hydraulic blocking action.

FIGS. 4, 5, 6, 7, 8, 9 and 10 are views similar to that shown in FIG. 2 showing parts of seven respective alternative embodiments.

Reference will first be made to FIGS. 1 to 3 which illustrate by way of non-limiting example use of the invention on a pressure vessel formed by a hydropneumatic accumulator.

The pressure vessel comprises a rigid casing 10 having a gas orifice 11 and a liquid orifice 12 which are disposed opposite to each other.

Fitted to the gas orifice 11 is a gas charging valve 13 to which a movable separator 14 such as a deformable bladder is connected. The movable separator 14 extends within the casing 10 between the orifices 11 and 12 and divides the casing 10 into a gas compartment 15 and a liquid compartment 16, which are variable in volume.

Fitted into the liquid orifice 12 is a cylindrical connector 17 which at its upper end defines a conical bearing surface forming a seat at 18. The connector 17 is provided in its interior with a central guiding hub portion 19 and has a circular series of orifices 21.

The central guiding hub portion or guide 19 has an aperture 22, 23 and 24 which is coaxial with the casing 10 (see FIGS. 2 and 3). The aperture of the guide 19 successively comprises a large-diameter portion 22, a smaller-diameter portion 23 and a portion 24 which is slightly larger in diameter than the portion 23.

A valve 25 comprises a head portion 26 which is capable of closing the liquid orifice 12 by being applied against the conical seat 18, and a stem portion 27 which is mounted slidably in the guide 19. More particularly, the stem portion 27 comprises a larger-diameter part 28 which is slidable in the portion 22 of the guide 19, a smaller-diameter part 29 which is slidable in the portion 23 of the guide 19, and a screwthreaded end portion 30. The screwthreaded end portion 30 carries a sleeve 31 which is slidable in the portion 24 of the aperture in the guide, while a nut 32 is screwed onto the screwthreaded end portion 30 to lock the sleeve 31 on the stem portion 27. It will be noted that, when the valve 25 moves from the position shown in FIG. 3 to the position shown in FIG. 2, the sleeve 31 is permitted to move into the portion 24 with a dash-pot effect, which makes it possible to slow down the upward movement of the stem portion 27.

The stem portion 27 defines a variable-volume chamber 33 in the guide 19. More particularly, the variable-volume chamber 33 is defined in the portion 22 of the aperture in the guide 19, around the part 29 of the stem portion 27 and below the part 28 of the stem portion 27.

A liquid passage generally indicated at 34 is provided in the valve 25 and extends between the chamber 33 and an orifice 35 disposed in the vicinity of the head portion 26 of the valve 25. More particularly, the orifice 35 is disposed immediately below the head portion 26, where the pressure is relatively low.

In the embodiment shown in FIGS. 1 to 3, the passage 34 comprises a diametral duct 36 which communicates with the chamber 33 and an axial duct 37 in the stem portion 27. Mounted in a slightly enlarged portion 38 of the duct 37 is a hollow pin 39 which is split at 40. The upper end 41 of the hollow pin 39 defines a rest-condition support forming a non-sealing seat for a closure member 42. The closure member 42 forms a means for interrupting the flow of liquid, and is described in detail hereinafter.

The liquid passage 34 also comprises a cylindrical portion 43 of larger diameter. The cylindrical portion 43 is provided with a sealing seat 44 at its end which is towards the orifice 35. Defined within the seat 44 is a duct 45 which communicates with the orifice 35.

In the embodiment shown in FIGS. 1 to 3, the closure member 42 is formed by a ball which is mounted movably in the cylindrical portion 43 and which is arranged to be urged by the liquid flowing from the chamber 33 into a position of closingly bearing against the sealing seat 44. A light conical coil spring 46 urges the ball 42 towards its position of being applied against the non-sealing seat 41 defined at the upper end of the split pin 39.

It will be appreciated that the ball 42 forms a kind of small inverted non-return valve which is installed within the large valve 25.

Reduced-section leakage means form a permanent communication between the two parts 43A and 43B of the cylindrical portion 43, which are disposed on respective sides of the ball 42. In the embodiment illustrated in FIGS. 1 to 3, the leakage means comprise a slight diametral clearance 47 between the ball 42 and the cylindrical portion 43.

The maximum volume (see FIG. 2) of the variable-volume chamber 33 is larger than the volume which is displaced by the ball 42 between its non-sealing seat 41 and its sealing seat 44, and takes account of the slight leakage due to the clearance 47.

The time required for movement of the ball 42 between the seats 41 and 44 is very short in order to provide for virtually immediate hydraulic blocking of the valve 25 in the case of a rapid return flow of liquid between the compartment 16 and the hydraulic installation connected to the connector 17. The time for movement of the ball 42 may be very short, because the counter-pressure at the orifice 35 is relatively low, by virtue of the orifice 35 being positioned under the head portion 26 of the valve 25, and the movement of the valve is only slightly retarded by the leakage at the clearance 47.

A deflector member 48 is disposed around the stem portion 27 under the head portion 26 of the valve 25. The deflector 48 is annular and serves as a support seat for a return coil spring 49 which is interposed between the head portion 26 of the valve 25 and the guide 19 in the connector 17.

The deflector 48 is simply held in a position of being applied against the underside of the head portion 26 of the valve 25, by the spring 49. The deflector 48 makes it possible to prevent the turns of the spring 49 from being crushed or collapsed, under the effect of a substantial liquid flow rate.

The spring 49 urges the valve 25 towards the open position in which the head portion 26 is spaced from the conical seat 18. The strength of the spring 49 is relatively low and in practice is only slightly higher than that required to balance the mass of the movable assembly, that is to say, the valve 25, increased in consideration of the hydraulic resistance and friction forces, bearing in mind that the valve 25 is blocked in the open position, in the course of operation.

For putting the pressure vessel into service, gas is introduced under pressure by way of the valve 13 into the gas compartment 15 defined by the bladder separator 14. The bladder 14 increases in volume and takes up a configuration corresponding to the whole of the contour of the inside surface of the casing 10, thereby closing the valve 25.

The connector 17 is then connected to a hydraulic installation where liquid under a pressure higher than the pressure of the gas stored in the bladder 14 is introduced into the connector 17 and lifts the valve 25 as it flows into the liquid compartment 16, thereby compressing the bladder 14.

The pressure vessel is in an operational condition.

In the present embodiment, the hydraulic installation is such that its hydraulic liquid requirements correspond to a constant predetermined volume which is less than the volume of the liquid compartment 16 when the bladder 15 is in its condition of maximum compression. In this way, when liquid is drawn from the liquid compartment 16 to be returned to the hydraulic installation, the bladder 14 which undergoes an increase in volume is never deformed to such an extent that it would reach the valve 25.

More particularly, the arrangement is such that the pressure of liquid in the compartment 16 when the compartment 16 is in its condition of minimum volume is higher than 130% of the pressure of the gas precharging the bladder 14.

When, in the course of normal operation, liquid is withdrawn from the compartment 16 at a high rate, to be returned to the hydraulic installation, the valve 25 tends to be abruptly closed by the suction effect of the rapid flow of liquid. By virtue of the invention, the only limitation imposed on the liquid flow rate is that which arises out of the cross-section of the passages 21. Mean flow rates of the order of one hundred liters per second may be achieved with a valve in which the passages 21 are of relatively substantial diameter.

When the valve 25 thus tends to close, the stem portion 27 thereof moves into the guide 19 and reduces the volume of the chamber 33. Liquid is thus expelled from the chamber 33 through the ducts 36 and 37 and the hollow pin 39 and lifts the ball 42 which moves into a position of bearing against the seat 44, notwithstanding the leakage which is permitted by the clearance 47, the section of which is too small to permit an appreciable amount of liquid to escape therethrough. The chamber 33 is thereafter prevented from decreasing in volume, and virtually immediate hydraulic blocking of the valve 25 takes place, that is to say, the valve 25 is hydraulically blocked well before the head portion 26 can come into a position of bearing against the seat 18 (see FIG. 3). This therefore automatically prevents the valve 25 from closing when liquid is rapidly returned to the hydraulic installation in the course of operation of the arrangement.

The response time of the ball 42 in moving between the seat 41 and the seat 44 may be adjusted by suitably adjusting the height of the pin 40, which determines the distance between the ball 42 and the sealing seat 44. Such adjustment may also be produced by suitable selection of the diameter of the ball 42 with respect to the diameter of the cylindrical portion 43 in which the ball 42 is disposed, thereby fixing the leakage clearance 47 at a larger or smaller sectional area. To give an idea in this respect, the difference between the diameters of the ball 42 and the cylindrical portion 43 may be of the order of four to five tenths of a millimeter.

For the purposes of maintenance of the pressure vessel, it may be necessary for the vessel to be completely emptied, by slowly returning the hydraulic fluid to the hydraulic installation, for example when stopping the installation or for the purposes of inspection. In that case, when the valve 25 is moved towards the seat 18, thereby reducing the volume of the chamber 33, such action is slow. The liquid flowing from the chamber 33 through the ducts 36 and 37 and the hollow pin 39, which is introduced into the cylindrical portion 43, can all flow through the clearance 47 around the ball 42, without moving the ball 42 away from its non-sealing seat 41. The liquid can therefore flow freely through the duct 45 and then be discharged to the exterior by way of the orifice 35. There is therefore nothing to prevent the valve 25 from closing under the direct thrust force of the bladder 14, which is desired in this case. It will be noted that the bladder 14 will only have to apply a very low thrust force to the valve 25 to close it, and there is therefore no danger of the bladder 14 being damaged, in any form whatever.

It will be appreciated that the device according to the invention is particularly simple and convenient in construction while also providing for accurate and automatic operation.

It will also be appreciated that the invention is of particular interest when the volume of liquid coming from the pressure vessel, which is capable of being absorbed by the hydraulic installation, is less than the maximum volume of liquid in the liquid compartment 16 of the pressure vessel.

In an alternative embodiment (see FIG. 4), the arrangement is similar to that described above with reference to FIGS. 1 to 3, but the height of the non-sealing seat 41 is made adjustable by the provision of a stack of a larger or smaller number of washers 50 which are disposed below the split pin 39, which makes it possible to adjust the travel of the ball 42 between its seats 41 and 44 and consequently the response time for hydraulically blocking the arrangement when liquid is rapidly returned to the hydraulic installation.

In another alternative embodiment (see FIG. 5), the split pin 39 is replaced by a hollow pin 51, the upper end of which is notched or crenellated at 52 to form the non-sealing seat 41. In this case, the height of the non-sealing seat 41 is made adjustable by screwing the pin 51 into a screwthread 53 in the guide 19 to a greater or lesser extent.

In another alternative embodiment (FIG. 6), the arrangement is similar to that described above with reference to FIG. 5, except that the orifice 35 of the passage 34 is disposed within the annular deflector 48 so as to be subjected to an even lower pressure.

In this case, the deflector makes it possible not only to prevent the turns of the return spring 49 from being collapsed under the effect of a substantial liquid flow rate, but also further to reduce the pressure at the orifice 35 of the passage 34. Accordingly, the difference between the pressures upstream and downstream of the ball 42 is reduced, which facilitates movement of the ball 42 between its non-sealing seat 41 and its sealing seat 44. In consequence, the response time in regard to the hydraulic blocking action is even shorter.

In another alternative embodiment (see FIG. 7), the arrangement is once again similar to those described above except that in this embodiment the closure member is formed by a plunger piston 42' which is mounted slidably in the cylindrical portion 43.

In this case, the leakage means comprise one or more ducts 54 in the plunger piston 42'.

The support member 41 for the closure member 42' comprises a seat 55 which in itself is a sealing seat but which is associated with a by-pass duct formed by an aperture 56 in the hollow pin 51. The mode of operation of this arrangement is similar to that described hereinbefore.

In another alternative embodiment (see FIG. 8), the arrangement is similar to that described above with reference to FIG. 7, but in this case the leakage means comprise on or more ducts such as grooves 54' provided in the outside wall surface of the piston plunger 42'.

Figure 8:
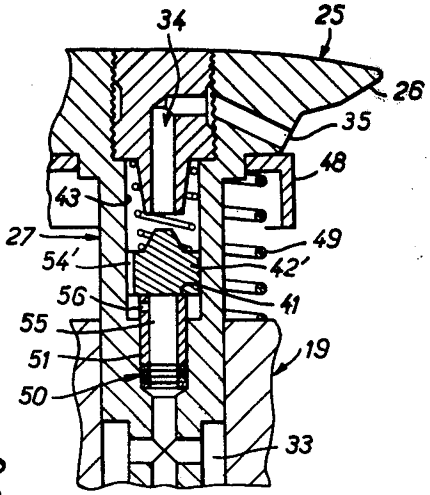
Figure 10:
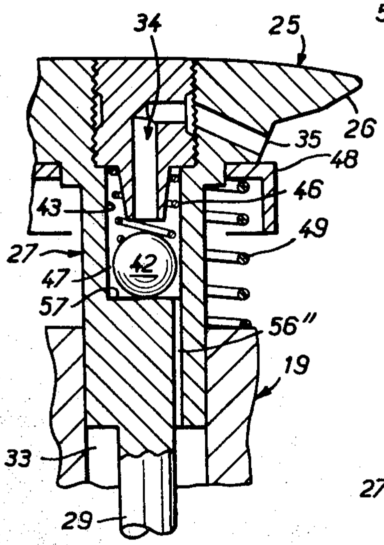
Figure 9:
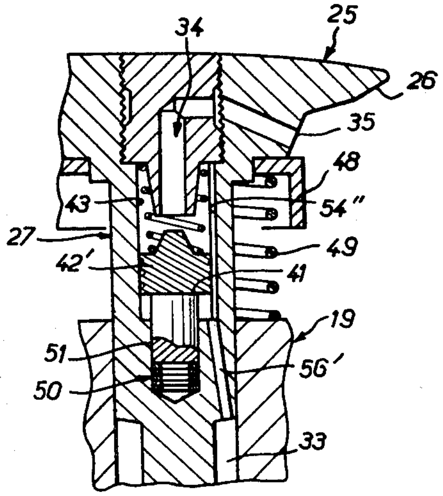

In another alternative embodiment (see FIG. 9), the arrangement is similar to that described above with reference to FIG. 8, but the support member 41 for the closure member 42' which is formed by the seat 55 which in itself is a sealing seat is associated with a by-pass duct 56' formed directly in the stem portion 27 of the valve 25. In addition, the grooves 54' shown in FIG. 8 are replaced in this embodiment by grooves 54" provided in the inside wall surface of the cylindrical portion 43.

In another alternative embodiment (see FIG. 10), the closure member which is in the form of a ball such as the ball 42 is arranged to rest on a flat end surface 57 of the cylindrical portion 43, while a duct 56" similar to the duct 56' is provided between the chamber 33 and the portion 43.

In the foregoing description, the movable separator comprises a deformable bladder, but it could also be formed by a piston. Likewise, the pressure vessel is described hereinbefore in the form of a hydro-pneumatic accumulator, but it could also be formed by any other suitable type of pressure vessel.

The embodiments of the invention in which an exclusive property or privilege is claimed are defined as follows:

1. A valve for a pressure vessel, the pressure vessel comprising a casing having a gas orifice and a liquid orifice which are disposed opposite to each other, and a movable separator which extends within the casing between the two orifices and which divides it into a gas compartment and a liquid compartment which are variable in volume, the valve comprising a stem portion which is mounted slidably in a guide and a head portion which is adapted to close the liquid orifice, said stem portion defining with said guide a variable-volume liquid chamber, said chamber decreasing in volume when the stem portion is moved inwardly and said chamber communicating by passage means with an orifice disposed in the vicinity of the head portion of the valve, the valve being characterized in that said passage means comprise means for interrupting the flow of liquid from said chamber responsive to decreases in volume of said chamber and leakage means between said chamber and an active portion of said liquid flow interrupting means.

2. A valve according to claim 1 characterized in that said passage means comprise a cylindrical portion provided with a sealing seat at the end nearest the orifice of said passage means and said liquid flow interrupting means comprise a closure member which is mounted movably in said cylindrical portion and adapted to be urged by the liquid in said chamber to come into closing contact against said sealing seat in response to a reduction in volume of said chamber, said leakage means providing a permanent communication, of reduced section, along said cylindrical portion, between portions of said cylindrical portion which are disposed on respective sides of the closure member.

3. A valve according to claim 2 characterized in that, at the end of the cylindrical portion of the liquid passage means which is remote from the sealing seat and which is towards the variable-volume chamber, the cylindrical portion comprises a support for defining a rest position of the closure member and towards which the closure member tends to be urged by a light spring, said support being capable of passing the flow between said chamber and said cylindrical portion.

4. A valve according to claim 3 characterized in that said support is defined by an end of a hollow pin which is split.

5. A valve according to claim 3 characterized in that said support is defined by a notched end of a hollow pin.

6. A valve according to claim 3 characterized in that said support is defined by an end of a hollow pin and is associated with a by-pass duct.

7. A valve according to claim 3 characterized in that said support is defined by an end of said cylindrical portion and is associated with a by-pass duct.

8. A valve according to claim 3 characterized in that adjusting means are provided for adjusting the height of the support.

9. A valve according to claim 8 characterized in that said adjusting means comprise a stack of a larger or smaller number of disc washers.

10. A valve according to claim 8 characterized in that the adjusting means comprise a screw means.

11. A valve according to claim 2 characterized in that the closure member comprises a ball.

12. A valve according to claim 2 characterized in that the closure member comprises a plunger piston.

13. A valve according to claim 2 characterized in that the leakage means comprise a slight diametral clearance between the closure member and the cylindrical portion of the passage means.

14. A valve according to claim 2 characterized in that the leakage means comprise at least one narrow duct in the closure member.

15. A valve according to claim 2 characterized in that the leakage means comprise at least one narrow duct in the stem portion of the valve.

16. A valve according to claim 1 characterized in that the orifice of the passage means is disposed immediately below the head portion of the valve.

17. A valve according to claim 1 characterized in that an annular deflector is disposed below the head portion of the valve.

18. A valve according to claim 17 characterized in that the orifice of the passage means is disposed within said annular deflector.

19. A valve according to claim 17 wherein the valve is returned to the position of opening the liquid orifice by a spring, characterized in that said annular deflector forms a seat for said return spring.

20. A valve according to claim 17 wherein the valve is returned to the position of opening the liquid orifice by a spring characterized in that the strength of said return spring is low and only slightly greater than that which is required to balance the mass of the valve, as increased in consideration of the hydraulic resistance and frictional forces.

21. A valve for a pressure vessel, the pressure vessel comprising a casing having a gas orifice and a liquid orifice which are disposed opposite to each other, and a movable separator which extends within the casing between said two orifices and divides it into a gas compartment and a liquid compartment which are variable in volume, said valve having a stem portion mounted slidably in a guide and a head portion adapted to close the liquid orifice, said stem portion defining with said guide a variable-volume liquid chamber, a liquid passage disposed in the valve and extending between said chamber and an orifice disposed below the head portion of the valve, characterized in that said passage comprises a cylindrical portion provided on the one hand with a sealing seat at its end which is towards the orifice of said passage and on the other hand a non-sealing seat at its end which is towards said chamber, while a ball is mounted movable in said cylindrical portion, being urged by a spring towards the non-sealing seat and being adapted to be urged by the liquid so as to move into a position of closure against the sealing seat in response to a reduction in the volume of said chamber, a reduced-section leakage means formed by a slight diametral clearance between the ball and said portion and an annular deflector disposed below the head portion of the valve and forming a seat for a weak spring for returning the valve to the open position.

* * * * *